July 30, 1935.  H. PLACIDE  2,009,679
COUPLING AND COUPLING DEVICE
Filed July 27, 1934
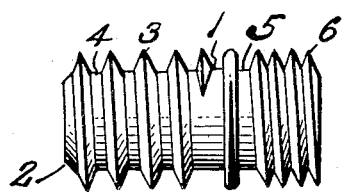
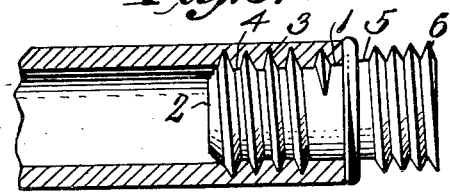
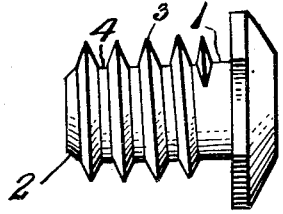
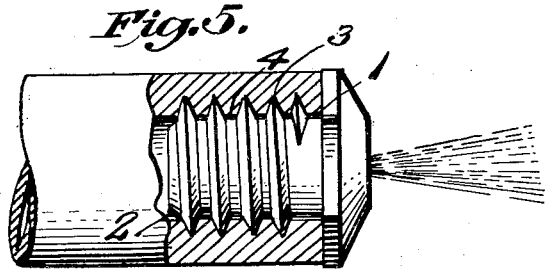
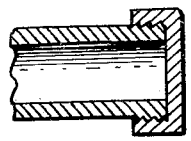
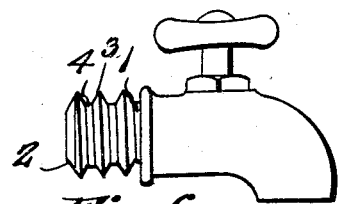
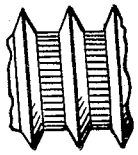
Henry Placide
Inventor:

Patented July 30, 1935

2,009,679

UNITED STATES PATENT OFFICE 2,009,679

COUPLING AND COUPLING DEVICE

Henry Placide, Baltimore, Md.

Application July 27, 1934, Serial No. 737,241

5 Claims. (Cl. 285—80)

This is a continuation in part of application Serial No. 625,033, filed July 27, 1932.

My invention relates generally to improvements in couplings or coupling devices on other articles and makes use of novel arrangements in connection therewith by providing on the body of a coupling or other article a helical coupling thread having a sharp cutting edge with the turns of the thread spaced a substantial distance apart to form surfaces therebetween, either serrated or smooth, whereby it can be screwed into a hose or other casing and be held there securely in place by the coupling thread being imbedded in the grooves cut thereby in the wall of the hose or other casing. This arrangement constitutes a new and novel method for fastening a coupling, nozzle, spigot or other article into a hose, or other casing or article.

By referring to other casing I mean also a pipe, plate, tank or other container, through or into the wall of which a fluid or air, or fluid or air connection or coupling, or spigot or other article, is to be entered. While my device is especially intended to be used in connection with hose or other casing, it is obvious that it may also be used in connection with a plate or wall into or through which it is desired to fasten a pipe, spigot or other article. It is a well known fact that when a tool for metal cutting is made of harded and more durable metal than the metal which is to be cut thereby it will cut into such softer metal in an entirely adequate and satisfactory manner, and the same is true of my coupling device where the cutting thread thereof is made of harder and more durable metal than the softer metal or other material into which the coupling thread cuts its own groove.

Other nozzles screw onto the rim of a coupling already attached into a hose or other casing whereas a nozzle equipped with my device can attach directly into the hose or casing itself by means of having an external helical coupling thread with a sharp cutting edge with the turns of the thread spaced a substantial distance apart to form surfaces therebetween, whereby it can cut its own groove into the wall of a hose or other casing and imbed itself securely therein.

An object of the invention is to provide on the body of a coupling or other article an external helical coupling thread having a sharp cutting edge with the turns of the thread spaced a substantial distance apart to form cylindrical surfaces, either serrated or smooth, between the convolutions of the thread whereby the coupling or other article will cut its own groove into the wall of the hose or other casing and imbed itself therein and thereby hold itself securely in place by the friction pressure of the two opposite edges of the groove cut by the thread against each corresponding side of the thread itself.

Another object is to provide within the body of a coupling or other cap or fitting an internal helical coupling thread having a sharp cutting edge with the turns of the thread spaced a substantial distance apart to form cylindrical surfaces between the convolutions of the thread whereby the coupling or other article will cut its own groove around the wall of a pipe or similar device and imbed itself therein and thereby hold itself securely in place by the friction pressure of the two opposite edges of the groove cut by the thread against each corresponding side of the thread itself.

Another object is to provide a coupling or other article having combined therewith a device for attachment into a hose or casing which will eliminate the additional couplings, clamps, screws or washers necessary in the methods now generally used of attaching couplings to hose or casings by inserting the inner end of a coupling or other article within the end of a hose or casing, where secured in place by clamps applied around the outside thereof, after which the outer protruding end of the coupling equipped with the conventional threaded rim can then receive thereon the nozzle, spigot or other attachment.

Another object is to provide a coupling or coupling connection or nozzle with side grips whereby a secure grip can be obtained thereon by which pressure can be exerted to forcibly screw it into a casing or over another coupling.

Other objects will appear in the following description.

The drawing illustrates the preferred embodiment of my invention as reduced to practice but as conditions concurrent with use of the device will necessarily vary it is to be understood that various minor changes in detail and construction, proportion or arrangement of parts, may be resorted to when desired without forfeiting any of the advantages of my invention as described herein.

In the accompanying drawing:

Figure 1 is a side elevation of a coupling with helical coulping thread attachment.

Figure 2 is a longitudinal section of the same coupling with helical coupling thread attachment.

Figure 3 is a side elevation of the same coupling with helical coupling thread attachment, as applied to a hose or other casing.

Figure 4 is a side elevation of a nozzle with helical coupling thread attachment.

Figure 5 is a side elevation of the same nozzle with helical coupling thread attachment, as applied to a hose or other casing.

Figure 6 is a side elevation of a spigot with helical coupling thread attachment.

Figure 7 is a fragmental view of a serrated surface of the cylindrical space between the turns of the helical coupling thread.

Figure 8 is a longitudinal section of a pipe or similar device with a cap or fitting attached over the end thereof.

Figure 9 is a side elevation of a nozzle of conventional type.

Corresponding and like parts are identified by the same reference to characters throughout the several views.

Referring to the drawing:

In Figures 1, 2 and 3 are shown couplings with a rim 5 with a coupling attachment 6 thereon of conventional type adapted to receive a nozzle or other attachment, and a body 1 terminating in a tapered end 2 and carrying thereon a helical coupling thread 3 having a sharp cutting edge with the turns of the thread spaced a substantial distance apart to form surfaces 4, therebetween, either serrated or smooth, whereby it can be screwed into a hose or other casing and be held there securely in place by the coupling thread being imbedded in the grooves cut thereby in the walls of the hose or other casing.

In Figures 4 and 5 are shown nozzles with a body 1 terminating in a tapered end 2 and carrying thereon a helical coupling thread 3 having a sharp cutting edge with the turns of the thread spaced a substantial distance apart to form surfaces 4, therebetween, either serrated or smooth, whereby it can be screwed into a hose or other casing and be held there securely in place by the coupling thread being imbedded in the grooves cut thereby in the walls of the hose or other casing.

In Figure 6 is shown a spigot of conventional type with a body 1 terminating in a tapered end 2 and carrying thereon a helical coupling thread 3 having a sharp cutting edge with the turns of the thread spaced a substantial distance apart to form surfaces 4 therebetween, either serrated or smooth, whereby it can be screwed into a hose or other casing and be held there securely in place by the coupling being imbedded in the grooves cut thereby in the walls of the hose or other casing.

In Figure 7 is shown the serrated surface of the cylindrical space between the turns of the helical coupling thread.

In Figure 8 is shown a pipe or similar device with a cup or fitting attached onto the end thereof.

In Figure 9 is shown a nozzle of conventional type with helical coupling thread attachment.

I claim:

1. A coupling device for attachment into a hose consisting of a body carrying thereon a helical coupling thread having a sharp cutting edge with the turns of the thread spaced a substantial distance apart to form flat surfaces therebetween.

2. A coupling device consisting of a body terminating in a tapered end and carrying thereon a helical coupling thread having an edge sufficiently sharpened to slit the inner wall of a hose or other casing when inserted thereinto, with the turns of the thread spaced a substantial distance apart to form surfaces therebetween and provide room for distortion of the rubber or other casing when the slit is opened by the body of the thread.

3. A coupling device consisting of a body terminating in a tapered end and carrying thereon a helical coupling thread having an edge sufficiently sharpened to slit the inner wall of a hose or other casing when inserted thereinto, with the turns of the thread spaced a substantial distance apart to form surfaces therebetween and provide room for distortion of the rubber or other casing when the slit is opened by the body of the thread; whereby the coupling is held from longitudinal displacement by the pressure of the edges of the slit against the sides of the thread itself the space between said threads being serrated to provide an intimate seal between the coupling and the wall of the hose.

4. A coupling device for attachment to a pipe or similar device, consisting of a body terminating in a tapered end and carrying therein a helical coupling thread having an edge sufficiently sharpened to slit the wall of the casing when inserted thereinto, with the turns of the thread spaced a substantial distance apart to form surfaces therebetween.

5. A coupling device for a nozzle consisting of an integral body terminating in a tapered end and carrying thereon a helical coupling thread having an edge sufficiently sharpened to slit the inner wall of a hose or other casing when inserted thereinto, with the turns of the thread spaced a substantial distance apart to form surfaces therebetween and provide room for distortion of the rubber or other casing when the slit is opened by the body of the thread; the space between said threads being serrated to provide an intimate seal between the coupling and the wall of the hose, or other casing.

HENRY PLACIDE.